United States Patent [19]
Taft et al.

[11] B 3,982,051
[45] Sept. 21, 1976

[54] BACKSIZING CARPET WITH HOT MELT COMPOSITION OF ETHYLENE COPOLYMER, ATACTIC POLYPROPYLENE AND VULCANIZED RUBBER

[75] Inventors: David D. Taft, Columbus, Ohio; Terry H. Shepler, St. Paul, Minn.

[73] Assignee: Ashland Oil, Inc., Ashland, Ky.

[22] Filed: Aug. 28, 1974

[21] Appl. No.: 501,415

[44] Published under the second Trial Voluntary Protest Program on January 13, 1976 as document No. B 501,415.

Related U.S. Application Data

[62] Division of Ser. No. 216,242, Jan. 7, 1972, Pat. No. 3,849,353.

[52] U.S. Cl. .................................. 427/207; 428/95; 428/96; 428/97; 427/398
[51] Int. Cl.² .......................................... B05D 5/10
[58] Field of Search ................. 117/122 H, 138.8 E; 427/207; 428/95, 96, 97

[56] References Cited
UNITED STATES PATENTS

| | | | |
|---|---|---|---|
| 3,577,372 | 5/1971 | Flanagan et al. ................ | 117/122 H |
| 3,619,270 | 11/1971 | Tesch ............................... | 117/122 H |
| 3,753,769 | 8/1973 | Steiner ............................. | 117/122 H |
| 3,849,353 | 11/1974 | Taft et al. ........................ | 161/247 X |

Primary Examiner—George F. Lesmes
Assistant Examiner—Patricia C. Ives

[57] ABSTRACT

Hot melt compositions containing copolymer of ethylene and vinyl acetate and/or alkyl acrylate wherein the alkyl group contains 1–18 carbon atoms; atactic polypropylene; and vulcanized rubber which are particularly useful as hot melt carpet backing adhesives and as hot melt pressure sensitive adhesives.

15 Claims, No Drawings

BACKSIZING CARPET WITH HOT MELT COMPOSITION OF ETHYLENE COPOLYMER, ATACTIC POLYPROPYLENE AND VULCANIZED RUBBER

This is a division of application Ser. No. 216,242, filed Jan. 7, 1972, now U.S. Pat. No. 3,849,353.

BACKGROUND OF THE INVENTION

The present invention is concerned with hot melt compositions which are especially but not solely useful as (A) adhesives for the backsizing of carpets, including tufted carpets, and (B) as hot melt pressure sensitive adhesives. More particularly the present invention is concerned with hot melt compositions which are substantially free of wax.

A. Tufted carpets are composite structures in which the yarn forming the pile, i.e., the surface of the carpet, is needled through a base fabric whereby the base of each tuft extends through the base fabric and is visible on the bottom surface. Tufted carpets are generally of two types, the first being the type commonly known as a "nap" carpet where the yarn loops are formed by needling or punching a continuous yarn just through the base fabric, thus forming the base of the carpet, while the tops of the loops are generally one-fourth inch to three-quarters inches long thus forming the wearing surface of the carpet. The second type of tufted carpet, commonly known as a "shag" carpet, has the same base as the "nap" carpet but the tops of the loops have been split or the tips of the loops have been cut off. The surface of the "shag" carpet is thus formed by the open ends of the numerous U-shaped pieces of yarn — the base of the U being embedded in the base fabric.

The loops of yarn are needled through and embedded in the base fabric (the combination of which is the raw tufted carpet) thus forming the tufted base, which must be secured to the base fabric to prevent the loops from being pulled out of the base fabric. The tufted bases are generally secured by applying an adhesive to the back of the raw tufted carpet to bond the tufted yarns to the base fabric. A secondary backing material is usually also applied to the back of the raw tufted carpet and bonded thereto with the same adhesive that bonds the yarn to the base fabric. The application of the secondary backing material further secures the loops of yarn since the loops of yarn are then bonded by the adhesive to the backing material as well as the base fabric.

The yarn used in forming the pile of a tufted carpet can be made of any type of fiber known in the art to be useful for tufted carpets, e.g., nylon, acrylics, wool, cotton, rayon and the like.

The base fabric or primary backing may be of any type known in the art and may be woven, for example, woven jute, woven slit polypropylene film, burlap, and the like, or may be non-woven fabric, e.g., needle punched, non-woven polypropylene web. Likewise, the secondary backing material may be of any type known in the art, e.g., woven jute, woven slit polypropylene film, burlap, foam material such as polyurethane foams or blown vinyl film and non-woven fabrics such as needle punched, non-woven polypropylene web, or blends of polyesters and polypropylene.

In preparing such tufted carpets, the adhesives are usually applied to the primary backing which holds the tufted matrix in the form of a latex. A secondary backing is then usually applied to the carpet. The carpet is then heated to cure the latex to ensure a bond between the latex and the tufted carpet, and the latex and the primary and secondary backings. This curing or drying of the latex is quite time consuming, expensive, and often leads to rejects because of insufficient curing during the process. In addition, overheating of the carpet may occur during the curing which in turn may affect the shade of the carpet.

In addition to the use of latex as an adhesive carpet backing, recently there has been some activity in the use of hot melt adhesives as carpet backings or sizing adhesives. For example, such hot melt adhesives have been based upon compositions containing copolymers of ethylene and vinyl acetate admixed with a wax such as paraffin wax or microcrystalline wax. For example, U.S. Pat. No. 3,390,035 discloses a hot melt adhesive consisting essentially of from 90 to 10% by weight of an ethylene/vinyl acetate copolymer and from 90 to 10% by weight of a wax. Such hot melt adhesives however exhibit incompatibility and sometimes separation upon cooling of the hot melt. In addition, such compositions have not demonstrated the degree of flexibility and adhesive strength desired by the carpet industry.

B. Pressure sensitive adhesives are one of the most widely used types of adhesives made today. Consequently a large volume of products using such adhesives are manufactured each year. The conventional pressure sensitive adhesives are made and applied in a solvent solution, necessitating the extensive use of solvents. The use of solvents is undesirable for a number of reasons. First, solvent based pressure sensitive adhesive production involves an inherent hazard of flamability of the adhesive. Second, in the production of such adhesives, special equipment is necessary to rapidly and efficiently remove the solvents from the products after the adhesive has been applied. Third, the use of large amounts of solvent increases the likelihood of pollution in areas where large amounts of adhesives are being produced. Finally, many potential materials to which the adhesive could be applied will be adversely affected by certain solvents. Thus solvent based pressure sensitive adhesives are unduly limited in use by the presence of the solvent.

For these and other reasons, the development of an effective pressure sensitive adhesive which requires little or no solvent in the manufacturing process is highly desirable.

Because of the application requirements of pressure sensitive adhesives, it is necessary, in formulating same to consider not only the adhesiveness but also the cohesiveness of the composition.

BRIEF DESCRIPTION OF INVENTION

The hot melt composition of the present invention consists essentially of:
1. From about 5 to about 50% by weight of a copolymer of ethylene and vinyl acetate, and/or alkyl acrylate wherein the alkyl group contains 1–18 carbon atoms and containing from 40–85% by weight of ethylene and from 15–60% by weight of vinyl acetate and/or the $C_1$–$C_{18}$ alkyl acrylate;
2. about 10–85% by weight of atactic polypropylene; and
3. about 10–50% by weight of vulcanized rubber.

The above quantities of copolymer, polypropylene and rubber are based upon the combined weight of the copolymer, polypropylene, and rubber and not necessarily upon the total composition which may contain other ingredients.

DESCRIPTION OF PREFERRED EMBODIMENTS

The hot melt composition of the present invention contains about 10 to about 85% by weight and preferably about 35 to about 70% by weight of atactic polypropylene. Atactic polypropylene is amorphous or substantially non-crystalline. Atactic polypropylene exhibits improved compatability with conventional tackifiers, which property facilitates its use in the composition of this invention.

The atactic, substantially non-crystalline, polypropylene used in the present invention can be obtained as a byproduct from the preparation of substantially crystalline, isotactic, polypropylene. For instance, in a solution polymerization process, the crystalline polypropylene precipitates out of solution, while the non-crystalline, atactic polypropylene remains dissolved in the inert polymerization solvent. The atactic polypropylene can then be recovered from the polymerization solvent by fractional distillation of the solvent. Usually the non-crystalline, atactic polypropylene employed in the present invention has a molecular weight of 10,000 to 100,000. The molecular weight, as referred to herein for the polypropylene, means a molecular weight obtained by inserting an intrinsic viscosity $[\eta]$ as measured in tetralin at 135° C into the following equation:

$$[\eta] = 1.93 \times 10^{-4} \times \overline{M}_n^{0.74}$$

The composition also contains about 10 to about 50% by weight and preferably about 13 to about 30% by weight of vulcanized rubber. The higher amounts of vulcanized rubber are desirable when the compositions are to be employed as pressure sensitive adhesive for improved cohesive properties. The degree of vulcanization is dependent on the properties desired in the end product as well as on the molecular weight of the initial elastomer rubber. Use of lower vulcanized rubber has the advantage of lower viscosity during processing and application of the hot melt composition. Furthermore, any desired additional cross-linking may be effected after mixing and application of the hot melt composition.

The vulcanized rubber may be vulcanized natural rubber and/or vulcanized synthetic rubber. Some suitable vulcanized synthetic rubbers include such vulcanized diene containing rubbers as vulcanized polyisoprene; vulcanized polybutadiene; vulcanized butyl rubber; and vulcanized copolymers of conjugated dienes and at least one other copolymerizable monomer such as styrene, acrylonitrile, methyl acrylate. The term "vulcanized" as used herein is intended to include not only fully vulcanized but also partially vulcanized materials. The suitable partially vulcanized rubber may contain as little as 2% but generally at least about 10% of the available sites for vulcanization, determined according to the considerations mentioned above.

The preferred vulcanized rubber is vulcanized butyl rubber. The vulcanized butyl rubber is a vulcanized or cured copolymer of from about 99 to about 90% by weight of isobutylene and from about 1 to about 10% by weight and preferably about 3% of a diene and preferably a conjugated diene, such as isoprene or butadiene.

In addition, the hot melt composition contains from about 5 to about 50% by weight of copolymer of ethylene and an unsaturated ester which is vinyl acetate or alkyl acrylate wherein the alkyl group contains 1–18 carbon atoms. When formulating a pressure sensitive adhesive hot melt according to this invention, it is preferable to use from about 25 to about 50% by weight of the copolymer in order to build the cohesion of the adhesive. The carpet backing adhesive hot melt preferably contains up to about 25% by weight of the copolymer and most preferably contains from about 10 to about 25% by weight of the copolymer.

The copolymers to be employed in the present invention contain from 40 to 85% by weight of ethylene and from 15 to 60% by weight of vinyl acetate or $C_1$–$C_{18}$ alkyl acrylate. Preferably the copolymer contains about 65 to 82% by weight of ethylene and about 35 to 18% by weight of vinyl acetate or $C_1$–$C_{18}$ alkyl acrylate. Generally the copolymer has a melt index of 5–580. Some examples of suitable alkyl acrylates include methyl acrylate, ethyl acrylate, propyl acrylate, butyl acrylate, hexyl acrylate, 2-ethylhexyl acrylate, dodecyl acrylate, lauryl acrylate and stearyl acrylate. Preferably the alkyl group of the acrylate contains 1–8 carbon atoms. In pressure sensitive adhesive applications, it is generally desirable to use a copolymer having a vinyl acetate or $C_1$–$C_{18}$ alkyl acrylate monomer content in the upper end of the 15 to 60% by weight range.

The most preferred alkyl acrylates are ethyl acrylate and butyl acrylate. Copolymers of ethylene and vinyl acetate and/or $C_1$–$C_{18}$ alkyl acrylate are commercially available and their methods of preparation are adequately described in the literature including numerous U.S. patents. For example, the procedures described in U.S. Pat. No. 2,200,429 are useful for preparing the copolymers of ethylene used in the present invention. The ethylene copolymers can also contain about 0.001 to 15% by weight of a comonomer such as acrylic acid, methacrylic acid, itaconic acid, acrylamide, beta dimethylaminoethyl methacrylate, beta hydroxyethyl acrylate, diallyl maleate, diallyl phthalate, diallyl ether, ethylene glycol dimethacrylate, hydroxypropyl acrylate, or hydroxypropyl methacrylate.

Some commercially available copolymers of ethylene suitable for the purposes of the present invention are Ultrathene 636X, which is a copolymer of 72% ethylene and 28% vinyl acetate with a melt index of 24; Ultrathene 638 which is a copolymer of 69% ethylene and 31% vinyl acetate with a melt index of 24; Ultrathene 639 which is a copolymer of 70% ethylene and 30% vinyl acetate with a melt index of 120; Ultrathene 653 which is a copolymer of 28% vinyl acetate and 72% ethylene with a melt index of 400; Ultrathene 664 which is a copolymer of 50% ethylene and 50% vinyl acetate with a melt index of 50; Ultrathene 662 which is a copolymer of 45% ethylene and 55% vinyl acetate and a melt index of 100; Ultrathene 633 which is a copolymer of 81% ethylene and 19% vinyl acetate; CoMer EVA 501 which is a copolymer of 72% ethylene and 28% vinyl acetate with a melt index of 350; CoMer EVA 505 which is a copolymer of 72% ethylene and 28% vinyl acetate with a melt index of 20; CoMer EVA 605 which is a copolymer of 67% ethylene and 33% vinyl acetate with a melt index of 20; Elvax 150 which is a copolymer of 67% ethylene and 33% vinyl acetate with a melt index of 22–28; Elvax 260 which is a copolymer of 72% ethylene and 28% vinyl acetate with a melt index of 5–7; Elvax 250 which is a copolymer of 72% ethylene and 28% vinyl acetate with a melt index of 15; Elvax 410 which is a copolymer of 82% ethylene and 18% vinyl acetate with a melt index of 430–580; Elvax 350 which is a copolymer of 75% ethylene and 25% vinyl acetate with a melt index of 19, Elvax 40 which is a copolymer of 60% ethylene and 40% vinyl acetate with a melt index of 45 to 70; CoMer DPDA-9169 which is a copolymer of 82% ethylene and 18% ethyl acrylate with a melt index of 20; and the Zetafax resins which are copolymers of ethylene and butyl acrylate. The Ultrathene polymers are available from USI, the CoMer polymers from Union Carbide, the Elvax polymers from Dupont and the Zetafax polymers from Dow Chemical.

The composition may also advantageously contain up to about 50% by weight of a tackifier. The composition preferably contains about 15–50% by weight of the tackifier and, more preferably contains about 25–40% by weight of the tackifier material. The most preferred quantity of the tackifier ingredient is about 30–35% by weight. Because of the application requirements of pressure sensitive adhesives, the amount of tackifier can be adjusted upwardly towards about 50% by weight in order to vary the cohesiveness of the pressure sensitive hot melt adhesive composition of this invention. The above quantities for the tackifier material are based upon the combined amount of copolymer, rubber, polypropylene and tackifier present in the composition.

The tackifier may be any suitable tackifier known generally in the art such as those listed in U.S. Pat. No. 3,484,405. Such tackifiers include a variety of natural and synthetic resins and rosin materials. The resins which can be employed are liquid, semi-solid to solid, complex amorphous materials generally in the form of mixtures of organic compounds having no definite melting point and no tendency to crystallize. Such resins are insoluble in water and can be of vegetable or animal origin, or can be synthetic resins. The resins employed function to provide substantial and improved tackiness of the rubber.

A class of resin components which can be employed as the tackifier composition hereof, are the coumarone-indene resins, such as the para coumarone-indene resins. Generally the coumarone-indene resins which can be employed have a molecular weight which ranges from about 500 to about 5,000. Examples of resins of this type which are available commercially include those materials marketed as Picco-25 and Picco-100.

Another class of resins which can be employed as the tackifier hereof are the terpene resins, including also styrenated terpenes. These terpene resins can have a molecular weight range from about 600 to about 6,000. Typical commercially available resins of this type are marketed as Piccolyte S-100, as Staybelite Ester No. 10, which is a glycerol ester of hydrogenated rosin, and as Wingtack 95 which is a polyterpene resin.

A third class of resins which can be employed as the tackifier are the butadiene-styrene resins having a molecular weight ranging from about 500 to about 5,000. A typical commercial product of this type is marketed as Buton 100, a liquid butadiene-styrene copolymer resin having a molecular weight of about 2,500.

A fourth class of resins which can be employed as the tackifier hereof are the polybutadiene resins having a molecular weight ranging from about 500 to about 5,000. A commercially available product of this type is that marketed as Buton 150, a liquid polybutadiene resin having a molecular weight of about 2,000 to about 2,500.

A fifth class of resins which can be employed as the tackifier are the so-called hydrocarbon resins produced by catalytic polymerization of selected fractions obtained in the refining of petroleum, and having a molecular weight range of about 500 to about 5,000. Examples of such resin are those marketed as Piccopale-100, and as Amoco and Velsicol resins. Similarly polybutenes obtained from the polymerization of isobutylene may be included as a tackifier.

The tackifier may also include rosin materials, low molecular weight styrene hard resins such as the material marketed as Piccolastic A-75, disproportionated pentaerythritol esters, and copolymers of aromatic and aliphatic monomer systems of the type marketed as Velsicol WX-1232. The resin which may be employed in the present invention may be gum, wood or tall oil rosin but preferably is tall oil rosin. Also the rosin material may be a modified rosin such as dimerized rosin, hydrogenated rosin, disproportionated rosin, or esters of rosin. Esters can be prepared by esterifying the rosin with polyhydric alcohols containing 2–6 alcohol groups.

The hot melt composition of the present invention may contain up to about 70% by weight of a solid filler material, based on the total weight of the composition. Preferably the composition contains between about 30 and about 60% by weight of the solid filler material. Some suitable solid fillers are calcium carbonate, clay, and talc. Calcium carbonate is the preferred filler. One feature of the present invention is the ability to incorporate such large quantities of solid filler material into the composition without detracting from the coating properties of the composition to such an extent as to render the composition unsuitable for its intended purpose. Flame retardant fillers may also be employed to improve the flame retardant properties of the composition. Such fillers are marketed under the trade designation of Phosgard obtainable from Monsanto and Firmaster obtainable from Michigan Chemical.

The composition of the present invention may also contain up to about 2% by weight and preferably from about 0.1 to 1.0% by weight of an antioxidant. The antioxidant aids also in maintaining the adhesion-cohesion balance in the pressure sensitive hot melts of this invention. Some suitable antioxidants include 2,2$^1$-methylene bis (-4-methyl-6-tert.butylphenol), 2,4,6-tri-tert.butylphenol, 2,6-di-tert.butyl-4-methylphenol, 4,4$^1$-thio-bis (-6-tert.butyl-m-cresol), butylated hydroxy anisole, and butylated hydroxy toluene. The preferred antioxidant is 2,2$^1$-methylene bis (-4-methyl-6-tert.butylphenol).

The hot melt compositions of the present invention provide excellent adhesion between the pile loops and the primary backing and between the secondary backing and the carpet. This excellent adhesion can be observed from the force in pounds required to pull one of the pile loops loose from the primary backing and from the amount of force in pounds required to separate the secondary backing from the carpet. For example, the hot melt compositions of the present invention require up to about 20 pounds of force to pull one of the pile loops loose from the primary backing whereas the conventional latex adhesives require only about 8 to 12 pounds of pull at equal application levels.

In addition the compositions exhibit surprisingly high flexibility, elongation and tensile properties. Also the hot melts of the present invention are surprisingly soft as compared to ethylene/vinyl acetate copolymer compositions containing wax, thus facilitating the coating procedure. Moreover, the compositions of the present invention are less likely to support combustion than are various wax containing hot melt compositions. Therefore they are much safer to use.

The compositions of the present invention demonstrate their excellent adhesion properties when applied to polyolefin substrates such as polyethylene and polypropylene. Polyolefin fibers and/or backings have not been commercially employed to the extent desired because of the difficulty in finding adhesive compositions suitable for adhering these substrates to other substrates or to each other. The present compositions however surprisingly are excellent adhesives for these polyolefin substrates.

Of course, the carpet backing adhesive hot melts of the present invention can be employed as adhesives for articles other than carpets such as for paper articles, plastics, metals, and the like.

The hot melt compositions of the present invention can be prepared by any of the conventional means by which two or more ingredients are brought into intimate contact with each other. For example, the rosin, if used, the atactic polypropylene, vulcanized rubber and the antioxidant, if used, are added to a mixing vessel which is blanketed in a nitrogen atmosphere. The mixture is then heated to about 350° F. The copolymer of ethylene and vinyl acetate of $C_1 - C_{18}$ alkyl acrylate is then slowly added with stirring to the heated mixture. The stirring is continued at this temperature until a uniform melt forms. The filler can then be added to the mixture slowly with stirring until thoroughly dispersed therein. The molten mixture can then be pumped directly to a carpet coating or pressure sensitive adhesive-applying apparatus or can be cooled for storage and used at some later time.

The composition of the present invention can be applied to the particular substrate by any of the well known methods of applying coatings of molten adhesives. For example, the hot melt coating can be applied by extrusion, a heated doctor blade, or by passing the bottom surface of the tufted material in contact with the top surface of a rotating roller partially submerged in a tank of the molten adhesive. It is convenient to employ a doctor blade in order to control the thickness of the adhesive on the roller.

The carpet backing composition is applied to the carpet in amounts ranging from about 6 to about 40 ounces per square yard of carpet and at a temperature of about 160° F to about 375° F. It is, of course, understood that the temperature must be maintained so that melting or decomposition of the textile backings and fibers does not occur and substantially above the melting point of the coating composition. From about 15 to 80 feet of carpet per minute can be coated with the composition of the present invention.

In order to better understand the present invention the following examples are given in which all quantities are by weight unless the contrary is set forth.

The following examples illustrate the use of the compositions of the present invention as carpet backing adhesives. The adhesive according to the present invention is compared to prior art compositions.

EXAMPLE 1

The raw tufted carpet is a shag carpet composed of a jute base fabric weighing about 10 ounces/yard$^2$ and tufted with about 18 ounces/yard$^2$ of bulked continuous filament nylon carpet yarn which is needled into the base fabric at 5 needles per inch across the width of the base fabric and about 5 stitches per running inch of base fabric. The tuft loops extend 1 ¼ inch above the base fabric and the tufted bases extend one-sixteenth inch below the base fabric. The secondary backing material is woven polypropylene weighing about 3.5 ounces/yard$^2$.

The raw tufted carpet is passed under and adjacent to an extruder where the bottom (non-pile) surface is coated with 20–26 ounces/yard$^2$ of a molten coating composition at a temperature of 350° F and having the following formula:

|  | Parts |
| --- | --- |
| Copolymer of 67% ethylene and 33% vinyl acetate, having an inherent viscosity of 0.78 (0.25% in toluene at 86°F), a melt index of 22–28 (ASTM-D-1238-577), and a softening point of 240°F (ring and ball) (EVA 150) | 3.55 |
| Copolymer of 72% ethylene and 28% vinyl acetate, having an inherent viscosity of 0.94 0.25% in toluene at F), a melt index of 5–7 (ASTM-D-1238-577), and a softening point of 310° F (ring and ball) (EVA 260) | 3.55 |
| Tall oil rosin | 21.4 |
| Atactic polypropylene | 21.4 |
| Vulcanized copolymer of 97% isobutylene and 3% isoprene (Rubber Research H602) | 21.4 |
| 2,2'-methylene bis (-4-methyl-6-tert.butylphenol) | 0.4 |
| CaCO$_3$ (No. 1 White) | 28.3 |

The molten composition which is kept at 350° F is forced through the extruder head onto the back of the raw tufted carpet as it passes under the extruder head. The carpet then passes underneath a heated doctor blade which evenly distributes any excess adhesive that may be present. The carpet then passes between two rollers at which point the secondary backing material from the upper roll is applied to the back side of the carpet. The carpet is then passed into a forced-air cooling section 10 feet in length to set the coating composition. The primary and secondary backing materials are firmly bonded to each other, and the base of each loop in the pile is firmly bonded to the primary backing. A pull of 15–18 pounds is required to pull one of the pile loops loose from the primary backing. The carpet has a T "peel" of more than 25 pounds. In addition the carpet demonstrated excellent resistance to delamination when subjected to repeated bending and straightening.

In addition the percent elongation of a 40 mil film of the coating composition is greater than 300% as measured on an Instron Tensile Tester.

EXAMPLE 2

Example 1 is repeated except that the coating composition has the following formula:

|  | Parts |
| --- | --- |
| Copolymer of 72% ethylene and 28% vinyl acetate, having an inherent viscosity of .59 (0.25% in toluene at 86° F), a melt index of 335–465 (ASTM-D-1238-577) and a softening point of 180° F (ring and ball) | 9.0 |
| Tall oil rosin | 26.0 |
| Atactic polypropylene | 15.0 |
| Vulcanized copolymer of 97% isobutylene and 3% isoprene | 8.0 |
| 2,2'-methylene bis (-4-methyl-6- | 0.2 |

-continued

| | Parts |
|---|---|
| tert.butylphenol) | |
| CaCO₃ (No. 1 White) | 42.0 |

The primary and secondary backing materials are firmly bonded to each other, and the base of each loop in the pile is firmly bonded to the primary backing. A pull of 18–22 pounds is required to pull one of the pile loops loose from the primary backing. The carpet has a T "peel" of about 18–20 pounds. In addition the carpet demonstrates excellent resistance to delamination when subjected to repeated bending and straightening.

In addition the percent elongation of a 40 mil film of the coating composition is greater than 350% as measured on an Instron Tensile Tester.

EXAMPLE 3

Example 1 is repeated except that the secondary backing material is jute weighing about 10 ounces/yard².

The primary and secondary backing materials are firmly bonded to each other, and the base of each loop in the pile is firmly bonded to the primary backing. A pull of 15–18 pounds is required to pull one of the pile loops loose from the primary backing. The carpet has a T "peel" of about 20 pounds. In addition the carpet demonstrates excellent resistance to delamination when subjected to repeated bending and straightening.

EXAMPLE 4

Example 2 is repeated except that the secondary backing material is jute weighing about 10 ounces/yard².

The primary and secondary backing materials are firmly bonded to each other, and the base of each loop in the pile is firmly bonded to the primary backing. A pull of 18–22 pounds is required to pull one of the pile loops loose from the primary backing. The carpet has a T "peel" of about 25 pounds. In addition the carpet demonstrates excellent resistance to delamination when subjected to repeated bending and straightening.

EXAMPLE 5

Example 1 is repeated except that the secondary backing material is non-woven polyester polypropylene weighing about 4.2 ounces/yard².

The primary and secondary backing materials are firmly bonded to each other, and the base of each loop in the pile is firmly bonded to the primary backing. A pull of 15–18 pounds is required to pull one of the pile loops loose from the primary backing. The carpet has a T "peel" of about 30 pounds. In addition the carpet demonstrates excellent resistance to delamination when subjected to repeated bending and straightening.

EXAMPLE 6

Example 2 is repeated except that the secondary backing is non-woven polyester-polypropylene weighing about 4.2 ounces/yard².

The primary and secondary backing materials are firmly bonded to each other, and the base of each loop in the pile is firmly bonded to the primary backing. A pull of 18–20 pounds is required to pull one of the pile loops loose from the primary backing. The carpet has a T "peel" of about 30 pounds. In addition the carpet demonstrates excellent resistance to delamination when subjected to repeated bending and straightening.

COMPARISON EXAMPLE 7

Example 1 is repeated except that the coating composition has the following formula:

| | Parts |
|---|---|
| Copolymer of 67% ethylene and 33% vinyl acetate having an inherent viscosity of .78 (0.25% in toluene at 86° F), a melt index of 25 (ASTM-D-1238-577) and a softening point of 240 (ring and ball (ELVAX 150) | 14.0 |
| Rosin WW (Available from Tenneco) | 30.6 |
| Polypale (Available from Picco) | 8.2 |
| 2,2'-methylene bis (-4-methyl-6-tert.butylphenol) | 0.2 |
| CaCO₃ (No. 1 White) | 30.0 |
| Wax - Paraflint RG Fisher-Tropsch wax having a melting point of 215° F. | 17.0 |

A pull of 18 pounds is required to pull one of the pile loops loose from the primary backing. The carpet has a T "peel" of about 1.5 pounds. The carpet demonstrated considerable delamination when subjected to repeated bending and straightening. The percent elongation of a 40 mil film of the coating composition is only 30.

COMPARISON EXAMPLE 8

Example 1 is repeated except that the coating composition has the following formula:

| | Parts |
|---|---|
| Copolymer of 67% ethylene and 33% vinyl acetate having an inherent viscosity of .78 (0.25% in toluene at 86°F), a melt index of 25 (ASTM-D-1238-577) and a softening point of 240 (ring and ball) (ELVAX 150) | 14.0 |
| Rosin WW (Available from Tenneco) | 38.3 |
| 2,2'-methylene bis (-4-methyl-6-tert.butylphenol) | 0.3 |
| Barium sulfate | 30.0 |
| Wax - Paraflint RG Fisher-Tropsch wax having a melting point of 215° F | 17.4 |

A pull of 23 pounds is required to pull one of the pile loops loose from the primary backing. The carpet has a T "peel" of about 3.5 pounds. The carpet demonstrated considerable delamination when subjected to repeated bending and straightening. The percent elongation of a 40 mil film of the coating composition is only 200.

COMPARISON EXAMPLE 9

Example 1 is repeated except that the coating composition has the following formula:

| | Parts |
|---|---|
| Copolymer of 72% ethylene and 28% vinyl acetate having an inherent viscosity of .85 (0.25% in toluene at 86° F), a melt index of 15 (ASTM-D-1238-577) and a softening point of 280 (ring and ball) (ELVAX 250) | 17.5 |
| Rosin WW (Available from Tenneco) | 40.8 |
| 2,2'-methylene bis (-4-methyl-6-tert.butylphenol) | 0.2 |
| CaCO₃ (No. 1 White) | 30.0 |

| | Parts |
|---|---|
| Wax - Paraflint RG Fisher-Tropsch wax having a melting point of 215° F | 11.5 |

A pull of 25 pounds is required to pull one of the pile loops loose from the primary backing. The carpet has a T "peel" of about 35 pounds. The carpet demonstrated considerable delamination when subjected to repeated bending and straightening. The percent elongation of a 40 mil film of the coating composition is 365.

COMPARISON EXAMPLE 10

Example 1 is repeated except that the coating composition has the following formula:

| | Parts |
|---|---|
| Copolymer of 67% ethylene and 33% vinyl acetate having an inherent viscosity of .78 (a melt index of 22–28 (ASTM-D-1238-577) and a softening point of 240 (ring and ball) (ELVAX 150) | 10.0 |
| Rosin WW (Available from Tenneco) | 21.8 |
| Polypale (Available from Picco) | 5.9 |
| 2,2'-methylene bis (-4-methyl-6-tert. butylphenol) | 0.2 |
| $CaCO_3$ (No. 1 White) | 50.0 |
| Wax - Paraflint RG Fisher Tropsch wax having a melting point of 215° F | 12.1 |

A pull of 25 pounds is required to pull one of the pile loops loose from the primary backing. The carpet has a T "peel" of about 23 pounds. The carpet demonstrated considerable delamination when subjected to repeated bending and straightening. The percent elongation of a 40 mil film of the coating composition is 40.

COMPARISON EXAMPLE 11

Example 7 is repeated except that the secondary backing is jute weighing 10 ounces/yard².

The carpet has a T "peel" of about 30 pounds. The carpet demonstrated considerable delamination when subjected to repeated bending and straightening.

COMPARISON EXAMPLE 12

Example 8 is repeated except that the secondary backing is jute weighing 10 ounces/yard².

The carpet has a T "peel" of about 8 pounds. In addition the carpet demonstrated considerable delamination when subjected to repeated bending and straightening.

COMPARISON EXAMPLE 13

Example 9 is repeated except that the secondary backing is jute weighing 10 ounces/yard².

The carpet has a T "peel" of about 35 pounds. In addition the carpet demonstrated considerable delamination when subjected to repeated bending and straightening.

COMPARISION EXAMPLE 14

Example 10 is repeated except that the secondary backing is jute weighing 10 ounces/yard².

The carpet has a T "peel" of about 23 pounds. In addition the carpet demonstrated considerable delamination when subjected to repeated bending and straightening.

COMPARISION EXAMPLE 15

Example 7 is repeated except that the secondary backing is non-woven polyester-polypropylene weighing about 4.2 ounces/yard².

The carpet has a T "peel" of about 6.5 pounds. In addition the carpet demonstrated considerable delamination when subjected to repeated bending and straightening.

COMPARISON EXAMPLE 16

Example 8 is repeated except that the secondary backing is non-woven polyester-polypropylene weighing about 4.2 ounces/yard².

The carpet has a T "peel" of about 7 pounds. In addition the carpet demonstrates considerable delamination when subjected to repeated bending and straightening.

COMPARISON EXAMPLE 17

Example 9 is repeated except that the secondary backing is non-woven polyester-polypropylene weighing about 4.2 ounces/yard².

The carpet has a T "peel" of about 10 pounds. In addition the carpet demonstrated considerable delamination when subjected to repeated bending and straightening.

COMPARISON EXAMPLE 18

Example 10 is repeated except that the secondary backing is non-woven polyester-polypropylene weighing about 4.2 ounces/yard².

The carpet has a T "peel" of about 4 pounds. In addition the carpet demonstrated considerable delamination when subjected to repeated bending and straightening.

The pull required to pull one of the pile loops loose from the primary backing is determined by attaching a sample of the carpet to a Chatillon tension tester. The pile is pulled at 12 inches/min. until it pulls out and the value in pounds is recorded from the tester. The above procedure is repeated five more times and the average of the six tests is used as the value.

The T-Peel is determined by attaching a sample of the carpet having about 4 × 9 inches of laminated surface of an Instron Tensile Tester pulled for 6 inches and pulling at 12 inches/min. the sample apart at an angle of 180°.

A comparison of Examples 1–6 with 7–18 clearly establishes that the compositions of the present invention possess unexpectedly excellent adhesive properties, particularly when applied to a polyolefin containing substrate.

The following examples serve to illustrate the preparation of hot melt pressure sensitive adhesives according to the present invention.

Examples 19–24

| No. | Copolymer | Atactic Polypropylene | Rubber | Tackifier |
|-----|-----------|----------------------|--------|-----------|
| 19 | 10.0 - EVA copolymer of 50% ethylene and 50% vinyl acetate having melt index of 50 and sold by U.S. Industrial Chemical Co. under the name USI 664X | 20.0 | 50.0 - compound of one-third butyl rubber, one-third petrolatum and one-third hydrocarbon hard resin- sold by Enjay Chemical Co. under the name Enjay 70E76-21-6 | 20.0 - Non-heat reactive phenol-formaldehyde resin sold by Ashland Oil, Inc. under the name CR8318 Phenolic |
| 20 | 10.0 - USI 664X | 20.0 | 50.0 - Enjay 70E76-21-6 | 20.0 - a low M.W. styrene hard resin sold by Pennsylvania Industrial Chemical Corp. under the name Piccolastic A-75 |
| 21 | 10.0 - EVA copolymer of 40% vinyl acetate and 60% ethylene having a melt index of 9 and sold by U.S. Industrial Chemical Co. under the name USI 644X | 20.0 | 50.0 - Enjay 70E76-21-6 | 20.0 - Piccolastic A-75 |
| 22 | 21.0 - EVA copolymer of 75% ethylene and 25% vinyl acetate having a melt index of 16–22 and sold by Dupont under the name Elvax 350 | 22.0 | 20.0 - Enjay 70E76-21-6 | 37.0 - disproportionated pentaerythritol ester |
| 23 | 15.0 - USI 644X | 10.0 | 50.0 - Enjay 70E76-21-6 | 25.0 - Piccolastic A-75 |
| 24 | 21.0 - EVA copolymer of 72% ethylene and 28% vinyl acetate having a melt index of 16 and sold by U.S. Industrial Chemical Co. under the name USI 646X | 24.0 | 20.0 - Enjay 70E76-21-6 | 35.0 - disproportionated pentaerythritol ester |

The above ingredients in each example are intimately mixed while in a molten state. The molten mixture is maintained at a temperature of about 350° F and is extruded or otherwise spread on the desired surface. Upon cooling, the resulting composition exhibited good pressure sensitive adhesive properties.

What is claimed is:

1. A process for backsizing a tufted carpet having a primary textile backing and non-woven tufts of synthetic fibers protruding therefrom which comprises:
    a. heating to a temperature of about 160°F to 375°F, a hot melt coating composition, said hot melt composition consisting essentially of:
        1. copolymer of ethylene and unsaturated ester monomer selected from the group consisting of vinyl acetate; alkyl acrylate wherein the alkyl group contains 1-18 carbon atoms; and mixtures thereof; containing from about 40 to 85% by weight of ethylene and from about 15 to about 60% by weight of unsaturated ester monomer;
        2. atactic polypropylene; and
        3. vulcanized rubber; said composition based upon the combined weight of (1), (2), and (3) containing from about 5% to about 50% by weight of (1); about 10 to about 85% by weight of (2) and about 10 to about 50% of (3);
    b. applying a uniform coating in an amount from about 10 to 40 ounces per square yard of said composition in a molten state to the backside of said carpet at a coating station while moving said carpet past said station at a speed of from about 20 to 60 feet per minute; and
    c. thereafter solidifying said carpet by cooling it below its melting point.

2. The method of claim 1 wherein said copolymer is a copolymer of ethylene and vinyl acetate which contains from about 82 to about 50% by weight of ethylene and from about 50 to about 18% by weight of vinyl acetate.

3. The method of claim 1 wherein said vulcanized rubber is vulcanized butyl rubber.

4. The method of claim 1 wherein said hot melt composition contains about 10 to about 22% by weight of said copolymer based on the combined weight of (1), (2) and (3).

5. The method of claim 1 wherein said hot melt composition contains about 13 to about 38% by weight of said vulcanized rubber based upon the combined weight of (1), (2), and (3).

6. The method of claim 1 wherein said hot melt composition contains about 10 to about 35% by weight of said atactic polypropylene based upon the combined weight of (1), (2), and (3).

7. The method of claim 1 wherein said hot melt composition also contains up to about 50% by weight of rosin or a modified form of rosin.

8. The method of claim 7 wherein said rosin or modified form of rosin is present in an amount of about 15 to about 50% by weight.

9. The method of claim 8 wherein said rosin or modified form of rosin is tall oil rosin.

10. The method of claim 1 wherein said composition also contains up to about 70% by weight of filler based upon the total weight of the composition.

11. The method of claim 10 wherein said filler is present in an amount from about 25 to about 55% by weight of the total composition.

12. The method of claim 11 wherein said filler is calcium carbonate.

13. The method of claim 1 wherein said composition also contains up to about 2% by weight of antioxidant based upon the total weight of the composition.

14. The method of claim 13 wherein said antioxidant is present in an amount from about 0.1 to about 1.0% by weight.

15. The method of claim 13 wherein said antioxidant is 2,2'-methylene-bis-(-6-tert.butyl-4-methylphenol).

* * * * *